Jan. 14, 1958  J. E. GILCHRIST  2,819,880
ROCK DRILLS
Filed Oct. 3, 1955

INVENTOR.
JOHN E. GILCHRIST
BY
Attorney 2,819,880

ROCK DRILLS

John E. Gilchrist, Seattle, Wash.

Application October 3, 1955, Serial No. 538,063

5 Claims. (Cl. 255—63)

The invention relates to rock drills comprising a drill rod, a removable drill bit, and the means that permit the ready and easy attachment of the drill bit to the drill rod.

The intense pounding to which the drill bit is subjected and which is transmitted through the joints between the drill bit and the drill rod creates a difficult problem. These joints should hold the drill bit and drill rod in firm fixed relationship and still be readily disconnected.

It is not surprising that much ingenuity, and many patents, have been directed toward perfection of an adaptor that rigidly connects the drill rod and the drill bit yet allows the ready removal of the drill bit when it is to be sharpened.

Many of these inventions, realizing that the pounding wears out threaded connections, employ a conical end on the drill rod or adaptor that fits into a female tapered hole on the drill bit. The patent granted to L. Saltzer on November 14, 1939, Number 2,180,120, illustrates this type of connection.

However, as the drill bit is of hardened steel and is usually fitted with carbide cutter, it may be pounded through 2,000 feet of rock. Tremendous circumferential bursting strains develop in the hub of the drill bit. Often the hub of the drill bit ruptures.

To avoid this, it has been proposed to place a shoulder on the drill rod and drill bit and so machine the drill rod that it bears on the drill bit both through this shoulder and through its end. Further, to obviate the need for a tight fit between the conical portion of the drill rod and the drill bit, the hole in the drill bit is undercut and the drill rod shank is machined with a tapered portion that enters this undercut part. To allow the forward end of the drill rod shank to pass down through a conical portion of the drill bit, the shank is slotted, but only through part of its length.

The present invention, by contrast, provides a shank having a slit, tapered, conical portion that fits snugly into the drill bit holding the two together but transmits the blows of the jack hammer through only one part of abutting shoulders on the adaptor and drill steel located at the outer end of the drill bit.

In the preferred form the drill bit is engaged by an adaptor.

The attachment of the adaptor to the drill rod also presents problems. The drill rod socket that holds the adaptor, not being as hard as the drill bit, may become distorted in the course of time.

The invention contemplates mounting the adaptor on the drill bit by the force-fit of its shank into a cylindrical hole in the drill rod that is deeper than the length of the adaptor shank and then, when the adaptor is to be removed from the drill rod, simply sawing off the annular section embracing the adaptor. The adaptor is now readily removed from the sawed off annular section and when the adaptor is to be remounted, the drill rod is provided with a new hole into which the adaptor end will force-fit.

The object of the invention is to provide means joining drill rod and drill bit that will transmit blows, permit the drill rod to be elevated bringing the cutter up with it, yet permitting the two to be readily separated and reconditioned with simple tools available in the field for further drilling.

Figure 1:
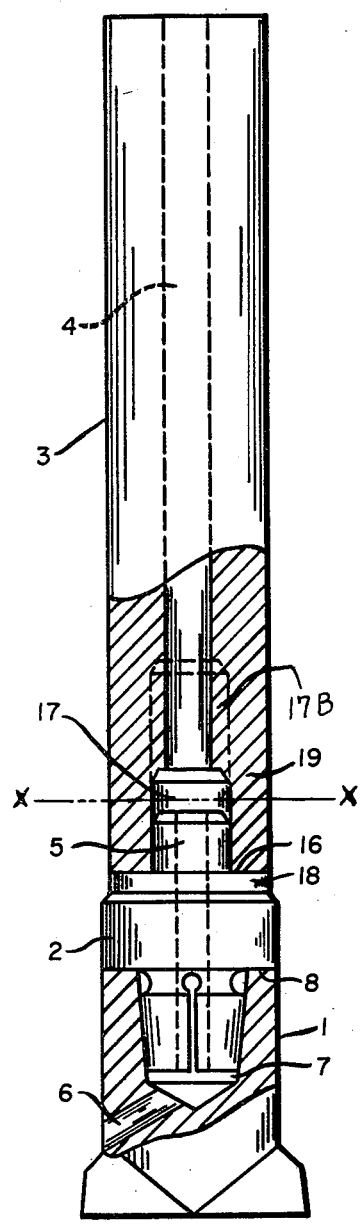
Figure 1 shows drill rod, adaptor, and drill bit in vertical elevation, partly in section.

In these figures 1 indicates a drill bit, 2 an adaptor, 3 a drill rod.

A hole 4 through which fluid passes, extends through the drill rod. The adaptor 2 has a similar hole 5, and the fluid fed to the drill bit is discharged into the hole being drilled in the rock through the drilled hole, 6 in the drill bit 1.

The hardened steel drill bit 1 has a tapered circular hole 7 and a horizontal shoulder 8 adapted to transmit the jack hammer blows from the adaptor 2 to the drill bit 1. This construction prevents bursting strains in the drill bit due to the jack hammer blows.

Figure 2:
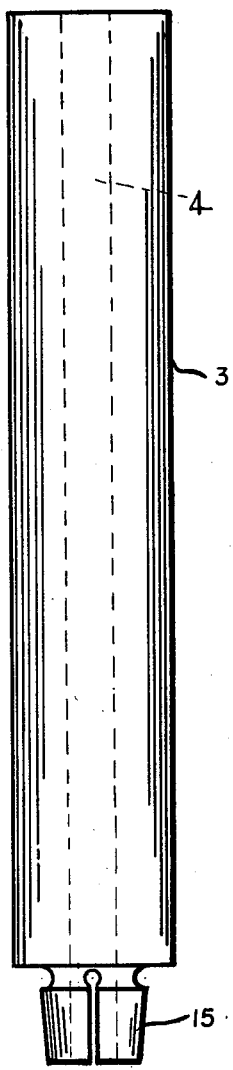
Figure 2 shows a modified form of the invention in which the drill rod is mounted directly in the drill bit.
Figure 3:
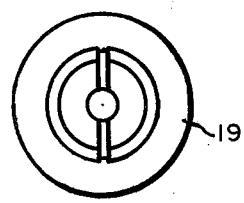
Figure 3 is a bottom view of the shank shown in either Figures 1 or 2.
Figure 4:
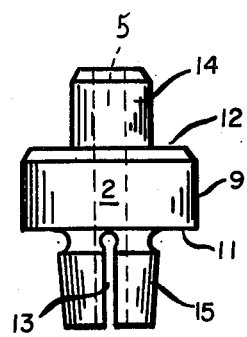
Figure 4 is a side elevation of an adaptor.

The adaptor 2 has a cylindrical body 9 having two shoulders 11 and 12. A shoulder 11 is adapted to bear against shoulder 8 of the drill bit 1. Extending below shoulder 11 is a conical extension 15 that is not as long as the hole 7. As shown in Figure 2, the upper end of the extension 15 is undercut. The extension 15 is slit at 13 throughout the entire length of the extension so that the two halves of the conical extension 15 can approach each other as pressure rises, preventing the circumferential strain in cutter 1 created by forcing extension 15 into hole 7 of the tool bit from increasing to a point where the hub of the drill bit would be split.

Extending above the cylindrical portion 9 of the adaptor is a cylindrical plug 14. This cylindrical plug is held to a precise diameter.

In the form of the invention shown in Figure 1, the drill rod 3 has a shoulder 16 and a cylindrical hole 17 bored of a diameter that will permit a force-fit of the plug 14. The hole 17 is deeper than plug 14.

In the form of the invention shown in Figure 2, the conical extension is part of the drill rod, eliminating the adaptor 2.

While not essential to the use of this apparatus, a cylindrical shock washer 18 may be placed between shoulders 12 and 16. This washer is made of material that has just enough resiliency to prevent the work hardening of surface 18 of the drill rod. The washer may be made of fiber glass or of a laminated phenolic plastic.

In the normal use of the parts described the drill rod, adaptor and the drill bit are mounted as shown in Figure 1 and used to drill a hole under the blows of a jack hammer applied to the top of the string of drill rods 3. When thus used, the force of the blows are transmitted through drill rod 3, shoulders 16, 12, 11, 8 to the drill bit.

When the cutting edges of bit 1 dull, the string of drill rods are elevated, a cut xx is made, cutting off the end of drill rod 3.

A new hole 17B is bored, the surface of the cut xx serving as shoulder 16 when the parts are reassembled.

The drill bit, adaptor, and the annular portion 19 of the drill rod are now taken to a central shop where the annular portion 19 is removed and discarded, the drill bit 1 and adaptor 2 separated.

The drill bit is now sharpened, the parts reassembled, and drilling again proceeds.

I claim:
1. An adaptor for use with a drill bit and a drill rod having a cylindrical body with end surfaces in parallel radial planes, a cylindrical plug extending axially out from the first of said end surfaces, a conical plug extending out from the second of said end surfaces, an undercut groove extending around the base of said conical plug leaving a conical surface on said plug spaced some distance from said second end surface, a radial slot in said conical plug extending through the entire length of said cylindrical surface and almost to the said second end surface.

2. The combination of a drill rod, adaptor, and drill bit comprising, a drill bit having a flat face and a central conical hole, an adaptor having a cylindrical body with flat end surfaces the first of which is adapted to bear against the flat surface of the drill bit to transmit the driving blows, a conical plug rising from said first flat surface of the adaptor and shorter than the depth of the conical hole in said drill bit into which it fits, an undercut groove extending around the base of said conical plug leaving a conical surface on said plug spaced some distance from said second end surface, a radial slot in said conical plug extending through the entire length of said cylindrical surface and almost to the said second end surface which enables the adaptor to engage said drill bit firmly enough to permit it being elevated out of a drill hole, but not to transmit such force of the drill blows as might rupture the annular end portion of the drill bit, a cylindrical plug rising from the other of said surfaces on the adaptor, a drill rod having a cylindrical hole that is a force-fit on said cylindrical plug, the hole being deeper than said cylindrical plug is long, so that axial blows are transmitted from the end of the drill rod to one end surface of the adaptor and from the other end surface of the adaptor to the drill bit.

3. A drill bit and an adaptor placed between the drill bit and a drill rod, comprising, in combination, a drill bit having a flat end and a central conical hole in said flat end, an adaptor having a cylindrical body with a flat end surface adapted to bear against the flat end surface of said drill bit, a conical extension shorter than the depth of said hole rising from the flat surface of the adaptor and fitting into said hole, an undercut groove extending around the base of said extension and making the remaining conical portion shorter than the length of said extension, a radial slot in said conical extension extending down below the remaining conical surface of the extension, whereby the blows transmitted to the adaptor by a drill rod are transmitted from the adaptor to the drill bit, and the conical extension will be tight enough in the hole to pick up the drill bit when the adaptor is lifted but is unable to transmit enough lateral pressure from the impact of blows to the annular part of the drill bit surrounding the conical extension of the adaptor to injure the drill bit.

4. The combination of a drill rod, adaptor, and drill bit in the manner described in claim 2 wherein an annular shock absorbing washer is placed between the end of the drill rod and the adaptor.

5. The combination of a drill rod and a drill bit comprising, a drill bit having a flat face and a central conical hole, a drill rod having a shoulder adapted to bear against the flat surface of the drill bit to transmit the driving blows, a conical plug shorter than the depth of said hole extending down from said face and fitting into said hole, an undercut groove extending around the base of said plug, a radial slot in said plug extending up through and beyond the portion of said conical plug that retains a conical surface so that the conical surface of said drill rod engages said drill bit firmly enough to elevate the drill bit out of a hole but is incapable of exerting a radial force sufficient to rupture the annular end portion of said bit.

References Cited in the file of this patent
UNITED STATES PATENTS

| | | |
|---|---|---|
| 436,558 | Buckingham | Sept. 16, 1890 |
| 1,943,879 | Rea | Jan. 16, 1934 |
| 2,180,120 | Saltzer | Nov. 14, 1939 |
| 2,354,656 | Annesley | Aug. 1, 1944 |
| 2,512,033 | Metz | June 20, 1950 |
| 2,569,275 | Baker | Sept. 25, 1951 |
| 2,602,672 | Wiard | July 8, 1952 |
| 2,609,638 | Lindenmeyer | Sept. 9, 1952 |